Figure 1:
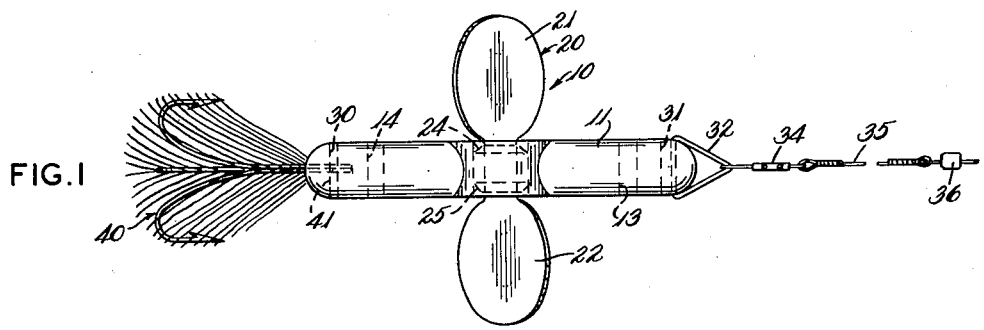

May 8, 1962   J. R. CROSSAN   3,032,910
FISH LURE

Filed Jan. 5, 1961   2 Sheets-Sheet 1

INVENTOR
JESSE R. CROSSAN

May 8, 1962     J. R. CROSSAN     3,032,910

FISH LURE

Filed Jan. 5, 1961     2 Sheets-Sheet 2

INVENTOR.
JESSE R. CROSSAN

United States Patent Office 3,032,910
Patented May 8, 1962

3,032,910
FISH LURE
Jesse R. Crossan, 345 Highland Ave., Wadsworth, Ohio, assignor of one-half to Fred B. Pfeiffer, Akron, Ohio
Filed Jan. 5, 1961, Ser. No. 80,866
4 Claims. (Cl. 43—42.22)

This application is a continuation in part of my copending application Serial Number 71,792, for Fishing Tackle, and filed Nov. 25, 1960.

The present invention is directed to fish lures and more particularly to a fish lure of a spinning type.

Spinning type fish lures used for trolling or casting, before the present invention, have generally been provided with a spinner element mounted on a body portion of the lure in such fashion as to permit the spinner blade to revolve freely without causing rotation of the body portion of the lure.

It is an object of the present invention to provide a plug-type fishing lure with impeller means for rotating the body portion of the plug.

A particular object of the invention is to provide a plug-type fish lure with impeller means associated therewith adapted to actuate the lure, when drawn against water, in which fishing is being done, in close simulation of a wounded and struggling fish, bird or other animal.

Another object of the invention is to provide a plug-type fish lure having a rotator blade for rotating the body of the plug and means for changing the inclination of the blade relative to said body whereby the action of the plug in operation may be conveniently modified as desired by a fisherman using the lure.

Spinner type lures are frequently used by fishermen when trolling and a swivel connection between the lure and the trolling line is provided to prevent twisting of the line and to permit proper action of the lure.

It is a common experience of fishermen for the swivel, or other means adapted to permit rotation of the lure independently of the line, to become fouled or fail to function properly. The malfunctioning or failure of the swivel is not readily detectable with the result that the lure or fouled free end of the line continuously rotates and imparts an extreme twist to the line which results in the line becoming twisted so hard that it is completely unmanageable when the line becomes slack. When a fisherman is fishing from a small boat and his line becomes twisted as just described he is unable to restore the line to useable condition while in the boat as the line twists itself into a hopeless tangle. As trolling is usually done at considerable distance behind a boat and no practical means for untwisting the line in a boat has been available, before the present invention, such lines are frequently discarded or are useless until they can be taken ashore and laboriously untwisted, and, in fact, frequently the twisted line has become so tangled it is abandoned ashore.

It is to be understood that "twist" as used in this application refers to the inadvertent twist of a fishing line that occurs during trolling and not to the twist that may be in the construction of the line.

A further object of the present invention is the provision of means of extreme simplicity and inexpensive for removing twist from a fishing line, said means being of such character and its method of use that a fisherman can safely, quickly and conveniently restore a twisted line to its normal condition.

A still further and important object of the invention is the provision of rotating means, for removing the twist from a fishing line, which means may be rotated clockwise or counter clockwise as may be required.

Figure 2:
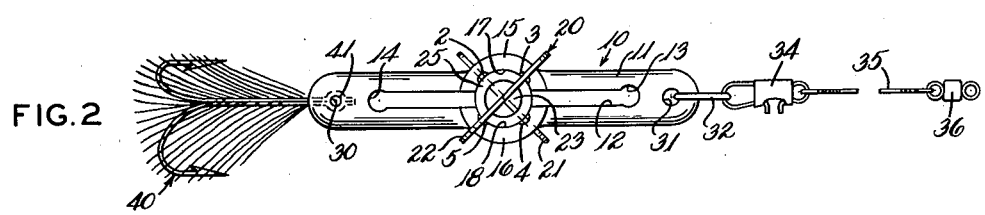
Figure 3:
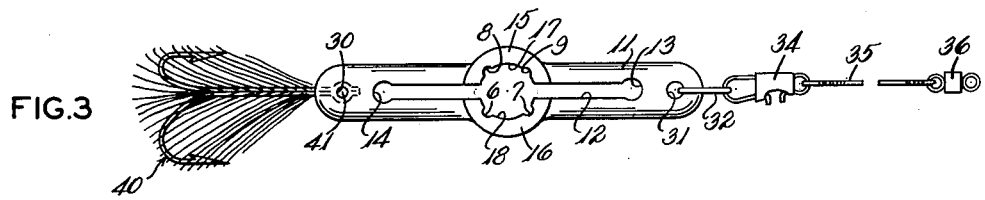
Figure 4:
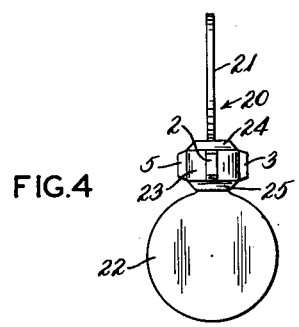
Figure 5:
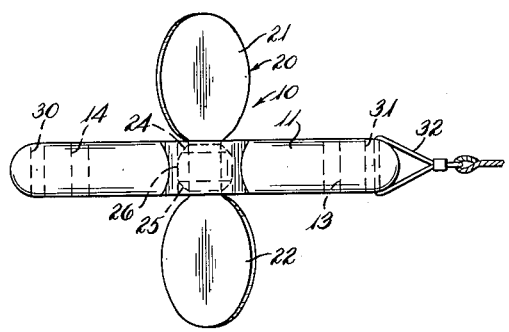
Figure 7:
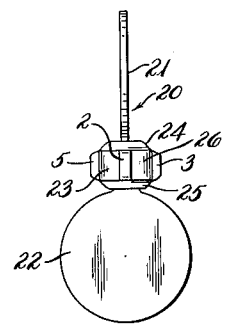
Figure 6:
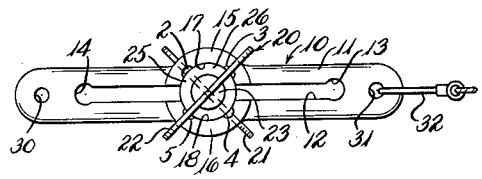
Figure 8:
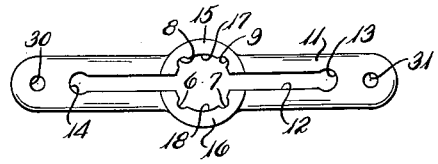

Other advantages of the invention will be apparent to those familiar with the art from the following description and by reference to the drawing wherein:

FIGURE 1 is a plan view of one form of the invention;
FIGURE 2 is a side view of FIG. 1;
FIGURE 3 is the same as FIG. 2 except the impeller blade has been omitted;
FIGURE 4 is a plan view of the impeller blade of FIG. 1 with one end portion of the blade having its edge turned upwardly;
FIGURE 5 is a plan view of one form of the invention;
FIGURE 6 is a plan view of the blade shown in FIG. 5 with one end portion of the blade having its edge turned upwardly;
FIGURE 7 is a side view of FIG. 5;
FIGURE 8 is the same as FIG. 7 except the blade has been removed;

Referring to the drawing in detail it will be seen that the invention as there illustrated comprises a plug-type fish lure, referred to generically as 10, including a body portion 11 preferably composed of polypropylene but may be of wood, a nylon resin or any other material found to be satisfactory; a rotator blade referred to generally as 20; line attachment means 32 at the front of the body, and bucktail gang hooks 40 attached at rear end of the body by means of the hole 30 through the body and a pin 41 extended through a hole 30 and an eyelet at the end of the stem of the hooks as will be understood by reference to the drawing. The attachment means 32 is composed of wire anchored in hole 31 through the front end of body 11. The invention contemplates ejection molding of said body portion of a suitable plastic material and in that case the attachment means would be molded in the body and a leader pin 34 would be pinned directly to the front end of the body and wire 32 omitted. As will be understood by those familiar with the art pin 34 is connected to a swivel 36 by means of a flexible line 35 and the swivel in turn is attached to the free end of a fishing line. It is to be understood that if found desirable swivel means may be interposed between body 11 and gang hooks 40 as will be obvious to those familiar with the art.

Body 11 is elongated and substantially round in cross-section and having a slot 12 extending through and longitudinally of the body and terminating in enlarged rounded ends 13 and 14 a short distance from each end of the body. Body 11 has embosses 15 and 16 disposed on opposite sides thereof approximately halfway along the length of slot 12 to accommodate a segment of circular enlargements 17 and 18 of the slot. The wall of the groove at enlargement 17 and 18 have small transversely extending grooves 8, 9 and 6, 7 respectively (see FIG. 3) disposed at 90° intervals about the circle of said arcuate recesses and equidistant from the center line of groove 12 for a purpose which will be explained as the description continues. The arcuate enlargements 17 and 18 and small transverse grooves are adapted to receive, index and anchor, in revolvable relation to said body, an impeller blade 20.

Blade 20 is designed to impart a rotating movement to body 11 when the latter is drawn through or on top of water and comprises end portions or vanes 21 and 22 having wide surfaces that lie in planes that are at right angles to each other.

Ends 21 and 22 are joined together by a shaft portion 23 that has conical ends 24 and 25 that merge radially outwardly into a cylindrical portion 26. Portion 26 is provided with low longitudinal ribs 2, 3, 4 and 5 disposed at 90° intervals about the shaft.

The thickness of end portions 21 and 22 is less than the width of groove 12 and the diameter of shaft 23 is just enough greater than the diameter of the circle of groove enlargements 17 and 18 to provide sufficient frictional contact to prevent rotation or shifting of shaft 23 relative to body 11 during operation of the rotator. It has been found that approximately 1/1000" greater diameter for shaft 23 than the diameter of the circle of said groove enlargement is satisfactory when polypropylene is used for the body since such material has the necessary resiliency characteristics.

The thickness of blade ends 21 and 22 is less than the opening of slot 12 so that to install the blade in the body an end portion as 21 is passed endwise through slot 12 with shaft 23 in alignment with the enlarged portion of the groove. This brings a tapered end as 24 of the shaft against the edge of the said arcuate enlargement of groove 12. With the blade disposed as just described hand pressure longitudinally of the shaft forces the groove to open and the shaft to enter said enlargement. When the shaft has been pressed lengthwise thereof to its operative position relative to body 11 the blade is next rotated by hand to cause ribs 2, 3, 4 and 5 to register in grooves 8, 9, 7 and 6 respectively whereby the forward surfaces of the blades are disposed at angles of 45° to the longitudinal center line of body 11 and in the relative positions of the blade and body just described it will be seen that when the rotator 10 is drawn against water the said blade will revolve body 11 clockwise concentrically about the body's longitudinal axis and the body will follow the line by which it is being drawn without any tendency to deviate from alignment with the drawing line. However, it is to be understood that the frictional contact of shaft 23 with body 11 is such that in operation of the lure the force of the water against blade 20 is not sufficient to cause rotation of the shaft 23 relative to the sides of said embossed portions 15 and 16 and this is true whether or not said small ribs are keyed in grooves 8, 9, 7 and 6. Therefore blade 20 may be readily manually turned on its axis to any desired inclination of the impulse faces of the blade relative to said body. Since the faces of blade ends 21 and 22 are disposed at right angles to each other it will now be seen that when one blade end face is disposed at less than 45° to the longitudinal center line of body 11 the face of the other end of the blade is disposed at an angle greater than 45° to the longitudinal center line of the body. For example, if blade end 21 is turned so that the inclination of its impulse face is at right angles to longitudinal center line of the body the impulse face of blade 22 is parallel with the said center line of the body. In the relative positions of blade and body just described it will be seen that the broad face of end 21 will be drawn directly against the water and will establish maximum resistance to the forward motion of the lure while the edge of end 22 will be drawn against the water and will create a minimum of resistance. The inclination of the rotator blade last described will not impart rotation about the longitudinal axis, of the body, but will cause the lure to fight the line, by which it is being drawn, against the water. By "fight" is meant the lure will attempt to tumble or turn about lengthwise. Such turning is overcome by the force of the pull of the fishing line, to which the lure is attached, which results in the lure making repeated and rapid short dives as it attempts to go out of alignment with the line.

Obviously a fisherman would not select the extreme relative inclination of the blade to the body and thereby sacrifice the spinning of the lure but he would select such said relative inclination of the blade relative to body 11 as would create the rapidity of combined spinning and diving of the lure as he considered best adapted to catch fish. Applicant has found, for example, that if blade end 21 is at an angle of 35° and blade end 22 at 55°, to the longitudinal center line of the body 11, and the lure 10 is pulled against the water at usual reeling speed, the movement of a struggling crippled fish or other animal will be very closely simulated by the lure and it is such action fishermen have sought in lures. In practice lures are reeled or trolled at different speeds depending on the kind of fish to be allured and the fisherman's idea of the most effective speed to use. The present invention provides means whereby the fisherman may control, to a considerable degree, the action of the lure in the water at various forward speeds of the lure.

The invention illustrated in FIGS. 1, 2, 3 and 4 has been described in connection with ribs 2, 3, 4, 5 and grooves 8, 9, 7, 6 but it is to be understood that additional ribs and corresponding grooves may be provided or such ribs and grooves may be eliminated and the frictional contact of the surfaces of shaft 23 and the surface of groove enlargement 17 and 18 may be created as to make any selected relative position of the shaft and the body operative.

Referring now to FIGS. 5, 6, 7 and 8 it will be seen that there is shown the same construction as illustrated in FIGS. 1, 2, 4 and 3 respectively, except the hooks 40, pin 41, and swivel 36, of FIGS. 1, 2, 3 and 4 have been omitted. It is to be understood that the body and the actuating means of the device shown in FIGS. 5, 6, 7 and 8 are the same as their corresponding elements of FIGS. 1, 2, 3 and 4 and therefore are identified by the same reference numerals.

Referring to FIGS. 1, 2, 3 and 4 it will be seen that the invention as there illustrated comprises a device, referred to generically as 10, adapted to be combined with a twisted fishing line 32 in a manner similar to that by which lures are attached with the exception that device 10 is attached directly to the line, by which is meant attached without intervening swivel, and is operated by being drawn against water at the end of the line either by the fisherman's reel or back of a moving boat or in any way a fisherman may find available.

When drawn through or on top of water, as just explained, device 10 will be caused to spin or rotate by the impulse of the water and will impart its rotation to the line to which it is directly attached. In the following description device 10 will be referred to as a "rotator." Rotator 10 comprises an elongated round body portion 11 preferably composed of nylon resin or similar plastic and having a slot 12 extending through and longitudinally of said body and terminating in enlarged rounded ends 13 and 14 a short distance from each end of the body. Body 11 has embosses 15 and 16 disposed on opposite sides of the body approximately halfway along the length of slot 12 to accommodate a segment of a circle enlargements 17 and 18 of the slot. The wall of the groove at enlargement 17 and 18 have small transversely extending grooves 8, 9 and 6, 7 respectively (see FIG. 4) disposed at 90° intervals about the circle of said arcuate recesses and equidistance from the center line of groove 12 for a purpose which will be explained as the description continues. The arcuate enlargement 17 and 18 and small transverse grooves are adapted to receive, index and anchor, in revolvable relation to said body, an impeller blade 20.

Blade 20 is designed to impart a rotating movement to body 11 when the latter is drawn through or on top of water and comprises end portions or vanes 21 and 22 having wide surfaces that lie in planes that are at right angles to each other.

Ends 21 and 22 are joined together by a shaft portion 23 that has conical ends 24 and 25 that merge radially outwardly into a cylindrical portion 26. Portion 26 is provided with low longitudinal ribs 2, 3, 4 and 5 disposed at 90° intervals about the shaft.

The thickness of end portions 21 and 22 is less than the width of groove 12 and the diameter of shaft 23 is just enough greater than the diameter of the circle of groove enlargements 17 and 18 to provide sufficient frictional contact to prevent rotation or shifting of shaft 23 relative to body 11 during operation of the rotator. It has been found that approximately 1/1000" greater diameter for shaft 23 than the diameter of the circle of said groove enlargement is satisfactory when a nylon resin is used for the body since such material has the necessary resiliency characteristics.

The thickness of blade ends 21 and 22 is less than the opening of slot 12 so that to install the blade in the body an end portion as 21 is passed endwise through slot 12 with shaft 23 in alignment with the enlarged portion of the groove. This brings a tapered end as 24 of the shaft against the edge of the said arcuate enlargement of groove 12. With the blade disposed as just described hand pressure longitudinally of the shaft forces the groove to open and the shaft to enter said enlargement. When the shaft has been pressed lengthwise thereof to its operative position relative to body 11 the blade is next rotated by hand to cause ribs 2, 3, 4 and 5 to register in grooves 8, 9, 7 and 6 respectively whereby the forward surfaces of the blades are disposed at angles of 45° to the longitudinal center line of body 11 and in the relative positions of the blade and body just described it will be seen that when the rotator 10 is drawn against water by twisted line 32 etc. which it is directly attached, the said blade will revolve body 11 clockwise and if the twist in the line is counter clockwise the line will be untwisted and if the action of the rotator is stopped when said twist has been removed the line will be in its original normal condition.

If in practice the fisherman observes that the twist of the line is clockwise the direction of rotation of the rotator may be reversed by simply turning the blades and the shaft 90° being careful that the small ribs register in the small grooves which accurately establishes the 45° angle and provides a keyed relation between the shaft and the body. To facilitate the use of the present invention the letter "R" is molded on the surface of blade end 21 to indicate that if that surface is drawn against the water a clockwise or right turn will result. Similarly a surface of end 22 has the letter "L" molded thereon to indicate that if that surface is drawn against the water the rotation will be to the left or counter clockwise. It will now be seen that rotator 10 is adapted to remove twist from the line regardless of the direction of the twist.

Obviously the invention is susceptible to modifications other than those illustrated and described, and the right is reserved to make such changes as fall within the scope of the appended claims without departing from the spirit of the invention.

I claim:

1. A fish lure comprising, an elongated body composed of elastic material and having a fish hook attached thereto, said body having a longitudinal slot therethrough intermediate the ends thereof, the sides of the slot having confronting arcuate recesses extending entirely through and transversely of the body; a one piece blade having end portions with water impulse receiving faces inclined at 90° angles to each other, a shaft joining said end portions together and disposed in the arcuate recesses in manually rotatable relation on its axis with the sides of the recesses; the size of the shaft being larger than the opening of the recesses in which it is disposed such as to require expansion of the slot opening to receive the shaft whereby a frictional contact is created between the shaft and the lure body; said frictional contact being sufficient to prevent rotation of the shaft relative to the contacting sides of the arcuate recesses when the lure is trolled, whereby said blade may be manually rotated relative to said body to various selected angular relations to the longitudinal center line of the body and retained there by said frictional contact during operation of the lure.

2. A fish lure of the character described comprising, an elongated body composed of an elastic material and having fish hooks associated therewith, said body having a longitudinal slot entirely therethrough intermediate its ends; an impeller blade having end portions with fluid impulse receiving surfaces which are inclined at 90° angles to each other; a shaft joining said end portions together and disposed in said slot in manually rotatable relation on its axis with the body; the size of the shaft being larger than the opening of the slot such as to require expansion of the slot to receive the shaft and provide frictional contact between the shaft and the sides of the slot, whereby the blade may be manually rotated, relative to the body, to various inclined relations therewith and retained in such relations by said frictional contact during operation of the lure.

3. A fish lure of the character described comprising, an elongated body of elastic material and having a fish hook attached thereto, said body having a longitudinal slot therethrough intermediate the ends of the body, the sides of the slot having confronting arcuate recesses extending entirely through and transversely of the body, the walls of the arcuate recesses having shallow grooves extending transversely of the body; a one piece blade having end portions with broad surfaces relative to their length which surfaces are inclined at a 90° angle to each other, a shaft-like portion joining said end portions together, the shaft-like portion being tapered adjacent the blade ends and having small axial extending ribs of size and spaced to key into said shallow grooves; said shaft-like portion being disposed in the arcuate recesses of the body in manually rotatable relation on its axis with the body, the size of the shaft-like portion being larger than the opening of the slot, at the arcuate portion, such as to require expansion of the slot opening to receive the shaft-like portion; said ribs disposed in said grooves, the disposition of the grooves and the ribs relative to each other being such as to accurately locate the plane of said surfaces of the blade at a 45° angle to the longitudinal axis of the body, whereby said blade may be manually turned relative to said body to various selected angular relations therewith and retained in such selected relations by the frictional contact of the shaft-like portion with the sides of the arcuate recesses and the disposition of the small ribs in the shallow grooves.

4. A rotator for removing twist from a fishing line comprising, an elongated body having a longitudinal slot therethrough intermediate the ends of the body, the sides of the slot having confronting arcuate recesses extending entirely through and transversely of the body, the walls of the arcuate recesses having shallow grooves extending transversely of the body; a one piece blade having end portions with broad surfaces relative to their length which surfaces are inclined at a 90° angle to each other, a shaft-like portion joining said end portions together, the shaft-like portion being tapered adjacent the blade ends and having small axially extending ribs of size and so spaced to key into said shallow grooves; said shaft-like portion being disposed in the arcuate recesses of the body in manually rotatable relation with the body, the size of the shaft-like portion being larger than the opening of the slot, at the arcuate recesses, such as to require a slight expansion of the slot to receive the shaft-like portion; said ribs disposed in said grooves, the disposition of the grooves and the ribs relative to each other being such as to accurately locate the said surfaces of the blade at a 45° angle to the longitudinal axis of the body, whereby said blade may be manually turned relative to the body and the direction of rotation of the rotator reversed as may be desired.

References Cited in the file of this patent

UNITED STATES PATENTS

| 2,696,061 | Swenson | Dec. 7, 1954 |

FOREIGN PATENTS

| 3,007 | Great Britain | Dec. 21, 1889 |
| 640,803 | Great Britain | July 26, 1950 |
| 682,484 | Great Britain | Nov. 12, 1952 |
| 117,194 | Sweden | Sept. 10, 1946 |